METHOD FOR IMPROVING THE SHARP TRANSITION OF SUPERCONDUCTIVE FILMS

Filed Nov. 25, 1959 2 Sheets-Sheet 1

INVENTORS
MARIANNE E. BEHRNDT
GARY R. GIEDD
MERLYN H. PERKINS
DONALD S. WEED
BY George Baron ATTORNEY May 28, 1963

M. E. BEHRNDT ETAL

METHOD FOR IMPROVING THE SHARP TRANSITION OF SUPERCONDUCTIVE FILMS 3,091,556

Filed Nov. 25, 1959

2 Sheets-Sheet 2

3,091,556

METHOD FOR IMPROVING THE SHARP TRANSITION OF SUPERCONDUCTIVE FILMS

Marianne E. Behrndt, Whittier, Calif., and Gary R. Giedd and Merlyn H. Perkins, Saugerties, and Donald S. Weed, Hurley, N.Y., assignors to International Business Machines Corporation, New York, N.Y., a corporation of New York Filed Nov. 25, 1959, Ser. No. 855,451
8 Claims. (Cl. 117—213)

This invention relates to the manufacture of thin films, and more particularly to the manufacture of thin films to be employed in superconductive devices and circuits.

The phenomenon of superconductivity, treated at length in such texts as the "Cambridge Monograph on Physics (Superconductivity)," by D. Shoenberg, Second Edition, 1951, relates to the unimpeded flow of current through a conductor maintained at temperatures near absolute zero. A thin film of material, such as tin or lead, when maintained at below its critical temperature will offer no resistance to current flow therethrough. However, should the temperature rise above its critical temperature, the thin film offers resistance to the flow of current. If a magnetic field is applied to the length of a long superconducting wire, or strip, the resistance of the latter is suddenly restored at a definite field strength, called the "critical field," which depends on the temperature, thickness, and purity of the wire or strip and is characteristic of the particular metal concerned. The abruptness with which resistance is restored will also depend upon the purity of the superconducting wire or strip. A paper that treats of this abrupt or sharp transition from the resistive state to the superconductive state, and vice versa, appears in the Royal Society of London, Philosophical Transactions, Series A, 1955–56, pp. 553–573, entitled "The Transition to Superconductivity," by P. R. Doidge.

The principles of superconductivity have been applied to the computer field because the two states of a superconductor, namely, its resistive state and its superconducting state, can be representative of two separate and distinct conditions that lend themselves to applications employing binary logic. However, whenever a bistable device is employed, it is desirable that the switching of the bistable device from one state to its other state be as rapid as possible. By narrowing the transition width in going from the superconductive state to the resistive state, one inherently increases the speed of switching of any circuit which will employ this invention.

In the manufacture of bistable superconductive elements, thin films of metal, of the order of $10^{-5}$ to $10^{-6}$ cm. thick, are prepared by evaporation under a vacuum onto a substrate of mica, glass or plastic, or any suitable supporting base. These thin films may be deposited in various lengths and widths. When a critical magnetic field is applied to a thin superconductive film, the film will switch from its superconductive state to its resistive state; stronger magnetic fields are needed to drive the thin film resistive the closer the temperature of the latter is to absolute zero. Upon removal of such magnetic fields, the superconductor will return to its superconductive state. It has been found that upon such return to the superconductive state, hysteresis has been obtainable with bulk superconductors or drawn wire superconductors, but no hysteresis effects were noticable when thin superconductive films were employed, that is, films that are deposited by means of vacuum deposition techniques.

The present invention has discovered a technique that not only obtains very sharp transitions from the superconductive state to the resistive state but also permits the obtaining of a hysteresis effect in very thin superconductive films. The novel technique calls for heating the substrate on which the thin film is to be deposited to a temperature of about 80° to 110° C. and maintaining the substrate at that temperature range prior to the actual vapor vacuum deposition. This heating prior to vacuum deposition results in the avoidance of sloping edges between the deposited layer and the substrate. This avoidance of sloping edges is desirable because the absence of sharp edges between the deposited film and the substrate has resulted in a decrease in the transition width, with the consequent reduction in driving currents needed to effect such transition.

Another embodiment of the invention that permits one to obtain sharp transitions from the resistive state to the superconductive state and vice versa comprises the evaporation, through a mask, of an initial layer, for example, of silver onto a glass substrate held at room temperature. This initial layer is approximately one atomic layer thick and is chosen to be of silver because the superconductive layer to be deposited over the initial silver layer is tin, and the latter readily "wets" silver. Where the superconductive thin film is lead, tantalum, or other element, then the underlying monoatomic layer is chosen so as to be compatible with and readily wet the superconductive layer. Gold or platinum are other suggested materials that can be used as an acceptable initial layer. It has been found that the initial layer produces nucleating centers around which a subsequent thin film can form. When the glass substrate is being heated, the superconductive layer being evaporated onto the glass substrate would form large agglomerations if no nucleating centers were present. Thus, the initial layer of silver serves to form small agglomerations of the superconductive tin deposited in the body of the film. The absence of silver in the sloping edges of the tin film permit large agglomerations of the tin to form, and thus the edge becomes discontinuous and non-conducting.

Consequently, it is an object of this invention to produce an improved thin film of superconductive material.

It is a further object to obtain a thin film of superconductive material having a sharp transition from its superconductive state to its resistive state and vice versa.

It is yet another object to provide a thin film of superconductive material having hysteresis as well as sharp transition from one state to another.

The foregoing and other objects, features and advantages of the invention will be apparent from the following more particular description of preferred embodiments of the invention, as illustrated in the accompanying drawings.

Figures 3, 4:
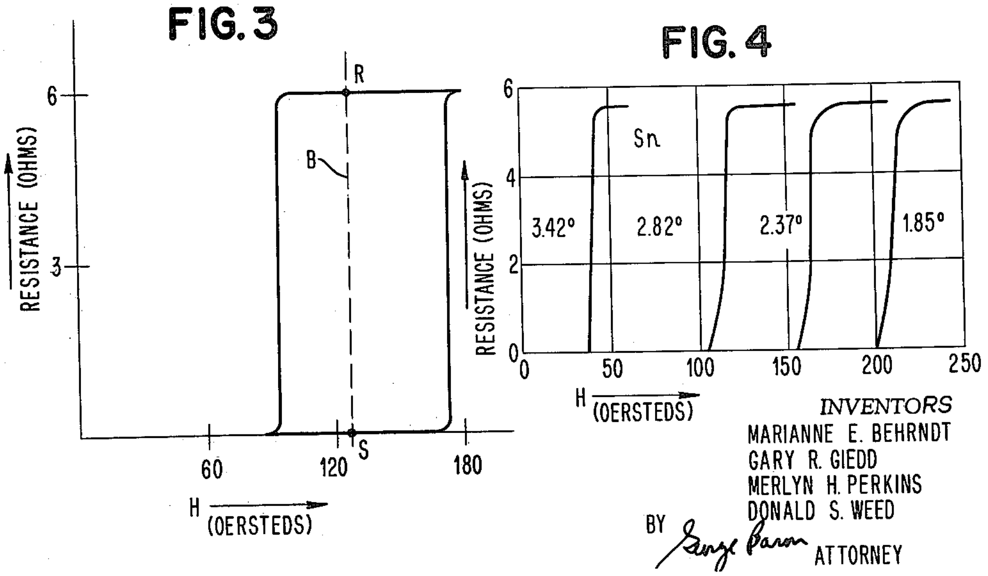
FIG. 3 is a transition curve for a thin tin film deposited on a heated substrate.
FIG. 4 is a resistance-magnetic field plot of a thin film of a superconductive material, such as tin, for various temperatures close to absolute zero.

FIG. 4 shows how sharply bulk tin, or tin that comes in the form of a wire, will change from its superconductive state to its resistive state. It is seen that for bulk tin at 3.42° K. it takes about forty gauss to drive the tin resistive whereas it requires about 200 gauss to drive the bulk tin to its resistive state at a temperature of 1.85° K. It has been found desirable to obtain the sharp transition curves of FIG. 4 with thin films. In order to attain such object, the deposited film must have sharp edges, i.e., no sloping of the edge of the deposited layer in its contact with its substrate. Since the presence of these sloping edges materially diminishes the transition widths, reference is now made to FIG. 1 in order to describe a technique for avoiding such sloping edges.

Figure 1:
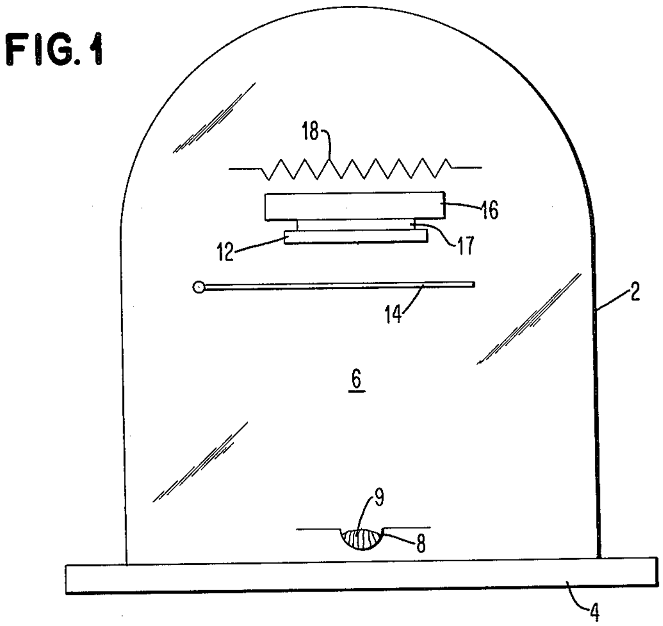
FIG. 1 is a schematic representation of a system for carrying out the invention.

FIG. 1 shows a bell jar 2 making an air-tight seal with a base plate, the bell jar 2 and support 4 being representative of vacuum systems capable of attaining low pressures of $5\times10^{-7}$ to $5\times10^{-6}$ millimeters of mercury. Inside the evacuated vessel 6 is a boat 8 which contains the substance 9 to be evaporated onto a glass substrate 17 through mask 12. The boat 8 may contain such elements such as tin, lead, tantalum, or indium, or any desired material that is superconductive at temperatures near absolute zero. If tin is selected, the boat 8 is maintained at a temperature of approximately 1250° C. A shutter 14 prevents evaporated tin from being deposited onto substrate 17. When the temperature of boat 8 and pressure of evacuated chamber 6 are at the desired levels, the glass substrate 17 is heated to a temperature of 80°–110° C. The heater for such substrate 17 will comprise a copper base 16 and a tungsten filament 18. When the copper base 16 and its adjacent substrate 17 have reached the desired temperature (80°–110° C.) and the boat 8 and its contents have reached their desired temperature, the shutter 14 is rotated out of position and the deposition of tin, lead, tantalum or indium, etc. begins and continues until a predetermined thickness of evaporating substance in boat 8 has been deposited onto substrate 17.

Figure 2:
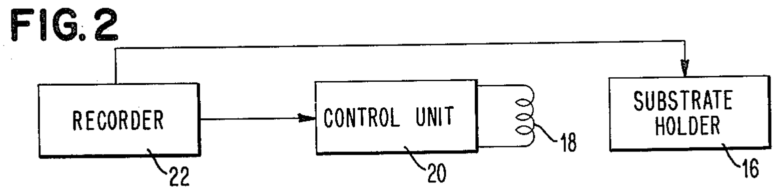
FIG. 2 is a schematic representation of a temperature control system for the substrate employed in FIG. 1.

FIG. 2 is a control unit for maintaining the substrate 17 at a desired temperature. Such temperature regulator is conventional and will comprise a heating element 18, a control unit 20 and a recorder 22 for recording the temperature of the substrate 10 during the vacuum deposition. Such a temperature control system and recorder is available as Speedomax H model and is manufactured by the Leeds and Northrup Co. Such temperature control system is only incidental to the invention shown and described herein, and any other suitable temperature monitoring means may be used without departing from the spirit of the invention.

FIG. 3 reveals the hysteresis of the thin film when the latter has been deposited in the manner described hereinabove. A field of approximately 170 oersteds, such field strength varying with film thickness and temperature, when applied to the thin film, will drive the superconductive film resistive, the transition being very sharp. The superconductor is in its resistive state until the field is lowered to about 90 oersteds and at that point there is a sharp transition back to the superconductive state. The hysteresis obtained for thin films is particularly desirable when the thin film is used as a bistable memory device. Moreover, if one uses highly controlled magnetic fields for driving the thin films from one state to the other, a magnetic bias, such as is represented by dotted line B, may be applied to the superconductor so that a slight positive magnetic field can switch the superconductor to its resistive state when it is in its superconductive state (point S), or a slight negative magnetic field, sufficient to overcome the bias field B, may be applied to return the thin film to its superconductive state when it is in its resistive state (point R).

In strip shaped thin films, the transition curves are strongly influenced by the edges of the film. As is seen in FIG. 1, because of the location of the boat 8 and the thickness of the mask 12, a penumbra of the evaporated element appears as a sloping edge on the substrate 17, which edge dwindles gradually to zero thickness. Since the critical magnetic field increases steeply with decreasing film-thickness, the penumbra area might remain in the superconducting or intermediate state while the main body of the film already has returned to the normal state. The effect of the penumbra is to broaden the transition curve. The above described procedure of heating the substrate prior to and during the vacuum deposition of tin prevents the formation of such sloping edge so as to maintain a sharp transition zone.

Figure 5:
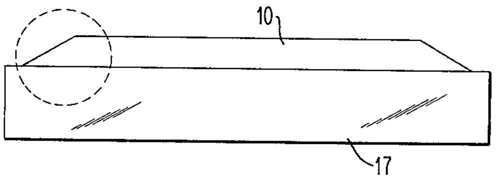
FIG. 5 is an embodiment of the invention employing a film of tin on a heated glass substrate.
Figure 6:
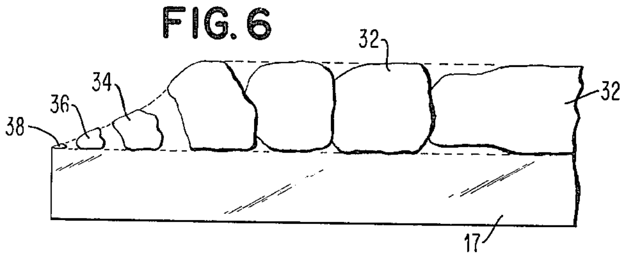
FIG. 6 is an amplified view of FIG. 5 looking at the area shown within the dotted circle.
Figure 7:
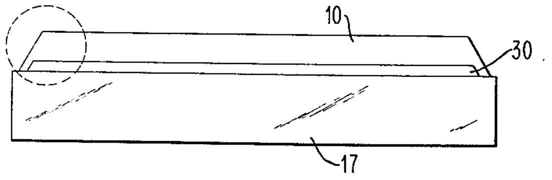
FIG. 7 is that embodiment of the invention employing a film of silver between the tin film and the glass substrate.
Figure 8:
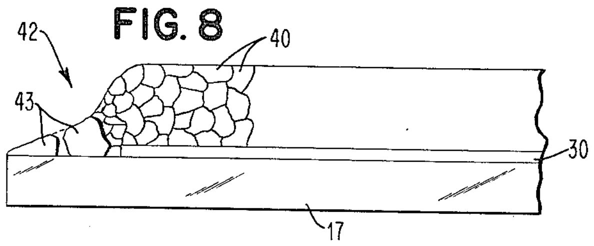
FIG. 8 is a view of FIG. 7 looking at the area shown within the dotted circle.

Turning to FIG. 7, there is shown an embodiment of the invention that employs a preliminary layer 30 of silver. The silver is deposited onto the glass substrate 17, the latter being at room temperature or lower. Such deposition is made in a vacuum chamber similar to that shown in FIG. 1. The silver layer 30 is deposited onto the glass 17 so that it is statistically a monoatomic layer or of the order of a monoatomic layer. The entire substrate of glass and silver is then heated to a temperature range of 70°–150° C., with 100°–110° C. being a preferred range for tin, within evacuated chamber 6. When the copper base 16, substrate 17, and silver layer 30 have reached about 100° C., tin is deposited to a thickness of 1000–10,000 angstroms, although thicknesses greater than 10,000 angstroms can be deposited using different temperatures. It has been found, however, that in the embodiment of the invention shown in FIG. 5, where no silver layer is employed, large globules 32 of tin, as shown in FIG. 6, are formed. The large globules 34, 36, 38, etc. that exist at the sloping edges of the thin film become discontinuous and smaller as they approach the edge of the film whereas the large globules 32 within the thick portion of the thin film contact one another at relatively small areas. Such distribution of the globules 34, 36 and 38 produce infinite impedance to electrical current at the sloping edges and a finite impedance in the thicker portions of the tin film 10. However, the large globules 32 in the main body of the thin film 10 contact one another in small areas so that high current density arises to drive portions of the thin film 10 resistive at low values of current. This low current-carrying capacity is undesirable in computer logic where it is required that such thin films 10 have relatively high current-carrying capacity before they are driven resistive.

The embodiment shown in FIG. 7 is relied upon to overcome the aforementioned defect of low current-carrying capacity, yet retain the characteristic of sharp transitions from the superconductive state to the resistive state, and vice versa. The substantially monoatomic deposition of silver 30 acts as a layer having a very high "wettability" for the thin film of tin 10 that is being deposited thereon through mask 12 so that the film of tin consists of small crystallites 40. These small crystallites make good electrical contact with one another and there is substantially no appreciable sloping edge. The sloping edge 42, if it were to form, will form with large crystallites 43 that will behave in the same manner as crystallites 34, 36 and 38 as shown in FIG. 6. The small crystallites 40 make good electrical contact so that the major body of the thin film of tin is a good conductor of electricity, permitting such film of tin to carry relatively high currents before it is driven resistant by such currents.

It is to be understood that when the superconductive thin film is tin, then the preferred monoatomic layer be silver. However another monoatomic layer, such as gold, could be employed. Where the superconductive film is lead or tantalum, then other monoatomic layers are employed so that they are "wettable" with the superconductive thin film that is to be deposited thereon, and such deposition may be made at temperatures different from those used for depositing tin.

The present invention permits one to obtain hysteresis and sharp field transition characteristics for thin films of superconductive material, whereas the prior art was able to obtain such characteristics only for bulk specimens. Moreover, by depositing a thin superconductive film onto a monoatomic layer that is wettable with the film, the latter is deposited as relatively tiny grains of tin rather than as large agglomerations of tin, thus improving the current-carrying capacity of the thin film.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method for improving the sharp transition from the superconductive state to the resistive state of a thin layer of superconductive material comprising the steps of heating a substrate onto which a superconductive thin layer is to be deposited to a temperature between 70° C. and 110° C., maintaining said substrate at a temperature within such range, and then depositing thereon by vapor deposition a layer of superconductive material having a thickness of about 1000–10,000 angstroms.

2. A method for improving the sharp transition of a thin film from the superconductive state to the resistive state and vice versa comprising the steps of depositing a substantially monoatomic layer of a metal onto a substrate, heating the substrate and such monoatomic layer to a temperature between 70° C. and 150° C., and maintaining them at a temperature within such range, and then depositing thereon by vapor deposition a superconductive element onto said monoatomic layer.

3. A method for improving the sharp transition of a thin film from the superconductive state to the resistive state and vice versa comprising the steps of depositing a substantially monoatomic layer of silver on a substrate, heating the substrate and such monoatomic layer to a temperature between 70° C. and 110° C. and maintaining them at a temperature within such range, and then depositing by vapor deposition a superconductive element onto said monoatomic layer.

4. A method for improving the sharp transition of a thin film from the superconductive state to the resistive state and vice versa comprising the steps of depositing a substantially monoatomic layer of silver on a substrate, heating the substrate and such monoatomic layer to a temperature between 70° C. and 110° C. and maintaining them at a temperature within such range, and then depositing a thin film of lead onto said monoatomic layer.

5. A method for improving the sharp transition of a thin film from the superconductive state to the resistive state and vice versa comprising the steps of depositing a substantially monoatomic layer of silver on a substrate, heating the substrate and such monoatomic layer to a temperature between 70° C. and 110° C. and maintaining them at a temperature within such range, and then depositing a thin film of lead between 1000–10,000 angstroms in thickness onto said monoatomic layer.

6. A method for both improving the sharp transition of a thin film from the superconductive state to the resistive state and vice versa as well as increasing its hysteresis characteristics comprising the steps of depositing a substantially monoatomic layer of a metal onto a substrate, heating the substrate and such monoatomic layer to a temperature between 70° C. and 150° C. and maintaining them at a temperature within such range, and then depositing by vapor deposition a superconductive element onto said monoatomic layer, said superconductive element being wettable with said monoatomic layer.

7. A method for improving the sharp transition of a thin film from the superconductive state to the resistive state and vice versa comprising the steps of depositing a substantially monoatomic layer of silver on a substrate, heating the substrate and such monoatomic layer to a temperature between 70° C. and 110° C. and maintaining them at a temperature within such range, and then depositing a thin film of tin onto said monoatomic layer.

8. A method for improving the sharp transition of a thin film from the superconductive state to the resistive state and vice versa comprising the steps of depositing a substantially monoatomic layer of silver on a substrate, heating the substrate and such monoatomic layer to a temperature between 70° C. and 110° C. and maintaining them at a temperature within such range, and then depositing a thin film of tin between 1000–10,000 angstroms in thickness onto said monoatomic layer.

References Cited in the file of this patent

UNITED STATES PATENTS 2,842,463 Bond et al. ............... July 8, 1958

OTHER REFERENCES

Holland: "Vacuum Deposition of Thin Films" (John Wiley & Sons, N.Y.) 1956, pages 203–207 and 257–259 relied on.